A. J. GRENON.
SMOKE HOOD FOR COOKING UTENSILS.
APPLICATION FILED FEB. 28, 1919.
1,308,412.
Patented July 1, 1919.
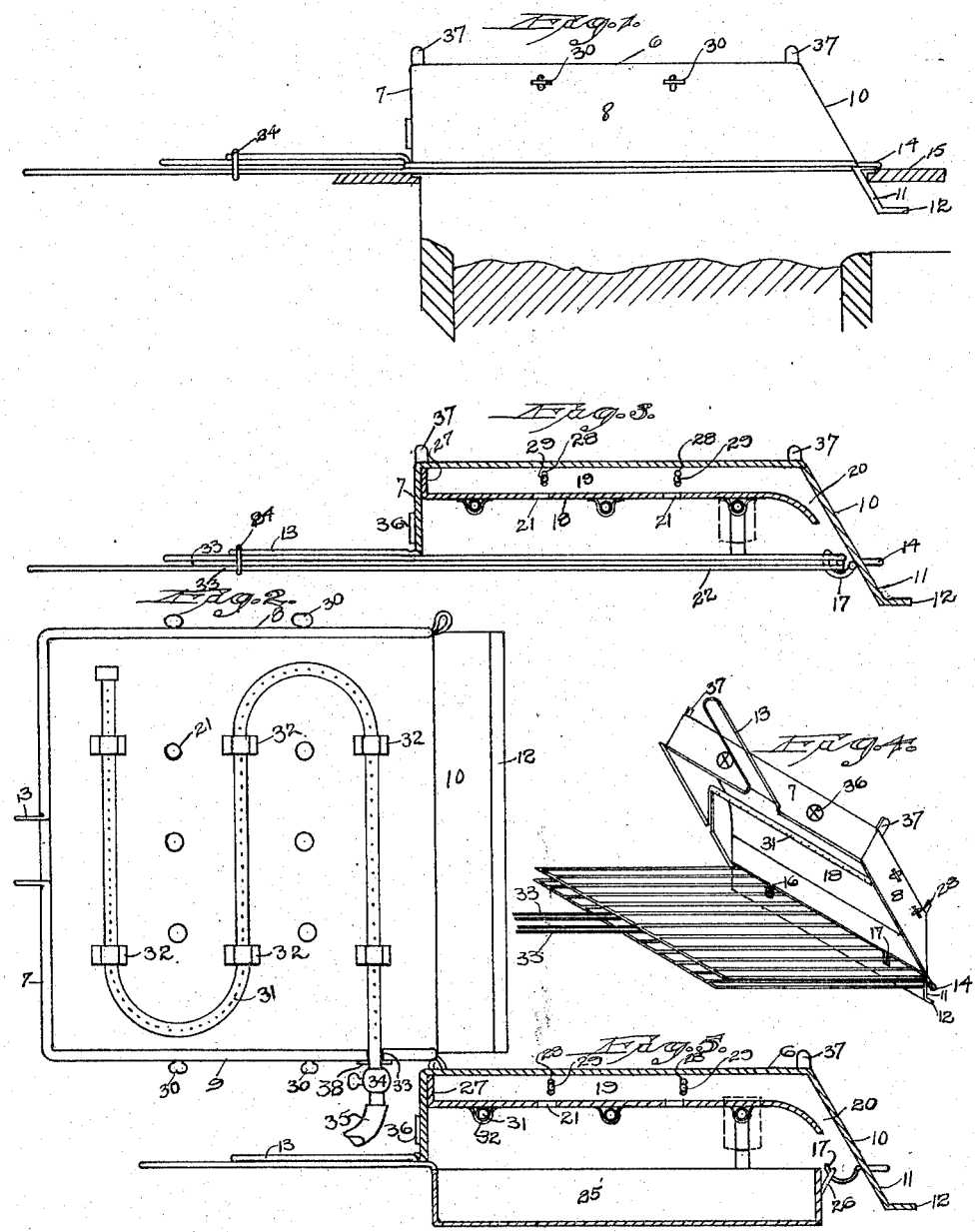

UNITED STATES PATENT OFFICE.

ARZIDAS J. GRENON, OF NEW HAVEN, CONNECTICUT.

SMOKE-HOOD FOR COOKING UTENSILS.

1,308,412.      Specification of Letters Patent.      Patented July 1, 1919.

Application filed February 28, 1919. Serial No. 279,775.

*To all whom it may concern:*

Be it known that I, ARZIDAS J. GRENON, a citizen of the United States, residing at New Haven, in the county of New Haven and State of Connecticut, have invented a new and useful Improvement in Smoke-Hoods for Cooking Utensils; and I do hereby declare the following, when taken in connection with the accompanying drawings and the characters of reference marked thereon, to be a full, clear, and exact description of the same, and which said drawings constitute part of this application, and represent, in—

Figure 1 a side view of a smoke hood for cooking utensils shown in connection with a broiler and indicated as placed upon the top of a stove.

Fig. 2 an underside view of the same.

Fig. 3 a longitudinal sectional view of the same.

Fig. 4 a perspective view of the hood and broiler with the hood in the raised position.

Fig. 5 a sectional view showing the hood in connection with a frying pan.

This invention relates to an improvement in smoke hoods for cooking utensils particularly adapted for use in connection with broilers and frying pans, the object being to provide a device which will support a broiler or frying pan and cover the same and conduct any smoke arising from cooking beneath the top of the stove or range, it being understood that the hood is adapted for use in connection with a stove, with the stove covers removed.

In carrying out my invention, I form a hood from sheet metal having a flat top 6, front wall 7, side walls 8 and 9, and rear wall 10, the rear wall being inclined rearwardly and projecting below the edge of the front and side walls forming a lip 11 the end 12 of which projects rearward. The edge of the pan is reinforced by a wire which at the front is formed with an outwardly projecting loop 13 providing a handle for the hood; with short loops 14 at each corner of the rear edge forming supports for the rear of the hood to rest upon the top 15 of a stove; and between the sides the wire is formed with hooks 16 and 17 for the purpose as will hereinafter appear. Within the hood and parallel with the top 6 is a transverse partition-wall 18 forming a chamber 19 between it and the top 6. This wall extends toward the rear where it is curved downward forming a contracted downwardly extending passage 20 at the rear. In this wall are a series of holes 21. Preferably and as herein shown, this partition wall is made adjustable by providing it with upwardly extending flanges 27 which is formed with a series of slots 28 through which bolts 29 may extend, these bolts having wing or thumb nuts 30 applied to their outer ends which project outward through the sides of the hood. Preferably, also, a perforated gas burner pipe 31 will be secured to the under face of this wall by straps 32 or otherwise, the end of the pipe extending outward through a slot 33 in the hood which will be closed by the slide 38 carried by a valve 34 which is connected with the gas pipe and with which a flexible connection 35 may be made from the source of supply. Preferably dampers 36 will be arranged in the front wall 7 of the hood. This device may be used in connection with a broiler 22 of ordinary construction the rear bars of which are engaged with the hooks 16 and 17, and the handles 33 engaged with the handle 13 of the hood by means of the usual loop 24 on the broiler. With the hood thus applied to a broiler, it is placed over the opening in the top 15 of a stove so that the broiler is supported over the opening in the top of the stove into which the rear of the hood extends. Smoke rising from the cooking, is drawn upward through the holes 21 into the chamber 19 from which it is drawn by the draft in the stove to the rear, where it is deflected downward into the stove so as to be drawn off into the chimney. This prevents the escape of any smoke into the room where the cooking takes place. If a gas pipe is provided as shown, the device may be used in connection with a cook stove without having a fire in the stove, thus producing not only a smoke hood, but a stove in itself as the hood may be provided as shown, with feet 37 by which the device may be supported in an inverted position.

As shown in Fig. 4 of the drawings, instead of using a broiler, a frying pan 25 may be provided at its rear with eyes 26 to engage with the hooks 16 and 17 so as to be supported thereby, the device acting in the same way with a frying pan to conduct smoke from cooking into the stove. As occasion requires the hood may be readily raised to inspect the cooking, and in the case of broiling the broiler may be readily detached from the hoods 16 and 17 and turned over in the usual manner.

I claim:—

1. A smoke hood for cooking utensils formed at its rear with a downwardly and rearwardly extending lip and provided with a transverse partition connected with the front and side walls of the hood and separated from the rear wall, said partition formed with a series of openings.

2. A smoke hood for cooking utensils formed at its rear with a downwardly extending lip, a transverse partition adjustably mounted in said hood and separated at the rear from the rear wall of the hood, said partition formed with a series of openings and a perforated gas pipe secured to the under face of said partition.

3. A smoke hood for cooking utensils formed at its rear with a downwardly extended lip and provided with a transverse partition separated at its rear from the rear wall of the hood, said partition formed with a series of openings and a perforated gas pipe secured to the under face of said partition.

4. A smoke hood for cooking utensils comprising a top, side, front and rear walls, the rear wall inclined rearwardly and downwardly below the front and side walls, a wire reinforcing the edge of the hood and formed with a handle projecting outward from the front edge and with hooks at the rear, a partition below the top of the hood forming a chamber between them, and openings through the partition into the chamber.

5. A smoke hood for cooking utensils comprising a top, side, front and rear walls, the rear wall inclined rearwardly and downwardly below the front and side walls, a wire reinforcing the edge of the hood and formed with a handle projecting outward from the front edge and with loops at each of the rear corners and with hooks intermediate of said loops, a partition below the top of the hood forming a chamber between them, and openings through the partition into the chamber.

6. A smoke hood for cooking utensils comprising a top, side, front and rear walls, the rear wall inclined rearwardly and downward below the front and side walls, a wire reinforcing the edge of the hood and formed with a handle projecting outward from the front edge and with hooks at the rear, a partition below the top of the hood forming a chamber between them, and openings through the partition into the chamber; combined with a cooking utensil adapted at its rear edge to engage with said hooks and to be covered by the said hood.

In testimony whereof, I have signed this specification in the presence of two subscribing witnesses.

ARZIDAS J. GRENON.

Witnesses:
 E. L. GLOUSAM,
 E. B. CLARK.

Copies of this patent may be obtained for five cents each, by addressing the "Commissioner of Patents, Washington, D. C."